United States Patent
Jin et al.

(10) Patent No.: US 10,603,747 B2
(45) Date of Patent: Mar. 31, 2020

(54) LEAD WELDING APPARATUS, BATTERY MODULE MANUFACTURED BY THE LEAD WELDING APPARATUS, AND BATTERY PACK COMPRISING THE BATTERY MODULE

(71) Applicant: LG Chem, Ltd., Seoul (KR)

(72) Inventors: Hee-Jun Jin, Daejeon (KR); Jeong-O Mun, Daejeon (KR); Se-Won Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 16 days.

(21) Appl. No.: 15/737,547

(22) PCT Filed: Jan. 4, 2017

(86) PCT No.: PCT/KR2017/000109
§ 371 (c)(1),
(2) Date: Dec. 18, 2017

(87) PCT Pub. No.: WO2017/200177
PCT Pub. Date: Nov. 23, 2017

(65) Prior Publication Data
US 2018/0169790 A1 Jun. 21, 2018

(30) Foreign Application Priority Data

May 18, 2016 (KR) .................. 10-2016-0060685

(51) Int. Cl.
*H01M 2/10* (2006.01)
*H01M 2/26* (2006.01)
(Continued)

(52) U.S. Cl.
CPC ............ *B23K 26/244* (2015.10); *B23K 26/21* (2015.10); *B23K 26/70* (2015.10); *B23K 26/702* (2015.10);
(Continued)

(58) Field of Classification Search
None
See application file for complete search history.

(56) References Cited

U.S. PATENT DOCUMENTS

| 6,357,649 B1 | 3/2002 | Okatsu et al. |
| 2011/0039131 A1 | 2/2011 | Moon |

(Continued)

FOREIGN PATENT DOCUMENTS

| CN | 101997136 A | 3/2011 |
| EP | 2 908 363 A1 | 8/2015 |

(Continued)

OTHER PUBLICATIONS

International Search Report and Written Opinion dated Apr. 28, 2017, for Application No. PCT/KR2017/000109.

*Primary Examiner* — Jonathan Crepeau
(74) *Attorney, Agent, or Firm* — Morgan, Lewis & Bockius LLP (57) ABSTRACT

Disclosed is a lead welding apparatus, which is used for welding electrode leads of battery cells facing each other, among battery cells of a battery module, and the lead welding apparatus includes a welding unit configured to weld two electrode leads of the facing battery cells to each other, and a welding jig configured to closely adhere the two electrode leads of the facing battery to each other and press the two electrode leads at one side of the two electrode leads, when welding is performed.

8 Claims, 6 Drawing Sheets

(51) Int. Cl.
     *B23K 37/04*      (2006.01)
     *B23K 26/244*     (2014.01)
     *B23K 31/02*      (2006.01)
     *B23K 26/21*      (2014.01)
     *B23K 26/70*      (2014.01)

(52) U.S. Cl.
     CPC .............. *B23K 31/02* (2013.01); *B23K 37/04* (2013.01); *B23K 37/0426* (2013.01); *B23K 37/0443* (2013.01); *H01M 2/10* (2013.01); *H01M 2/1077* (2013.01); *H01M 2/26* (2013.01); *H01M 2220/20* (2013.01)

(56) References Cited

U.S. PATENT DOCUMENTS

| | | |
|---|---|---|
| 2013/0280578 A1 | 10/2013 | Yang et al. |
| 2013/0330595 A1 | 12/2013 | Lee et al. |
| 2016/0233465 A1 | 8/2016 | Lee et al. |
| 2017/0125774 A1 | 5/2017 | Choi et al. |
| 2019/0074490 A1* | 3/2019 | Ishimaru ................. H01M 2/10 |

FOREIGN PATENT DOCUMENTS

| | | | |
|---|---|---|---|
| JP | 2001-102610 A | | 4/2001 |
| JP | 2006-344572 A | | 12/2006 |
| JP | 2016-048685 A | | 4/2016 |
| KR | 10-2012-0065279 A | | 6/2012 |
| KR | 10-2013-0131658 A | | 12/2013 |
| KR | 10-1370264 B1 | | 3/2014 |
| KR | 10-2015-0113827 A | | 10/2015 |
| KR | 10-2016-0016517 A | | 2/2016 |
| WO | 2006/109610 A1 | | 10/2006 |
| WO | 2013191480 A1 | | 12/2013 |
| WO | WO 2018131843 | * | 7/2018 |

\* cited by examiner

LEAD WELDING APPARATUS, BATTERY MODULE MANUFACTURED BY THE LEAD WELDING APPARATUS, AND BATTERY PACK COMPRISING THE BATTERY MODULE

TECHNICAL FIELD

The present disclosure relates to a battery pack, and a vehicle including the battery pack.

The present application claims priority under 35 U.S.C. § 119 to Korean Patent Application No. 10-2016-0060685 filed on May 18, 2016 in the Republic of Korea and under 35 U.S.C. § 365 to PCT/KR2017/000109, filed on Jan. 4, 2017, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module generally includes a plurality of battery cells and a module case that accommodates the plurality of battery cells. In addition, the module case includes a case body and a plurality of cell cartridges provided inside the case body to accommodate at least one battery cell. In the conventional battery module, electrode leads of two battery cells facing each other and accommodated in the module case may be welded and electrically connected to each other through a lead welding apparatus at the outside of the module case.

For this, a conventional lead welding apparatus includes a welding unit for welding two electrode leads arranged to overlap each other at the outside of the module case by laser welding, and a welding jig for pressing one side and the other side of two electrode leads of the battery cells facing each other when the welding is performed so that two electrode leads overlap each other.

However, in the conventional battery module, when the electrode leads are welded, the welding jig of the lead welding apparatus presses the two electrode leads to be closely adhered to each other at one side and the other side of the two electrode leads. When the pressing is performed, due to a pressing force transferred at both sides of the two electrode leads, the force is transmitted to the case body and the cell cartridges of the module case more than necessary, which may bend or damage the case body and the cell cartridges.

In addition, in the conventional battery module, if the module case is damaged, when the welding unit injects laser or the like for welding, the deviation of a focal distance of the welding unit may be influenced, which may deteriorate welding quality. Moreover, a welding defect between the electrode leads caused by the deterioration of welding quality may increase contact resistance later, which may cause heat generation of the battery module. In addition, when external vibration or impact occurs, the connection between the welded electrode leads may be easily broken.

Therefore, in order to solve the above problems, it is required to find a way to prevent the module case from being damaged when the electrode leads of the battery cells of the battery module are welded and to improve the welding quality.

DISCLOSURE

Technical Problem

Therefore, the present disclosure is directed to providing a lead welding apparatus which may prevent a module case from being damaged when electrode leads of battery cells of the battery module are welded and improve the welding quality, a battery module manufactured by the lead welding apparatus, and a battery pack comprising the battery module.

Technical Solution

In one aspect of the present disclosure, there is provided a lead welding apparatus, which is used for welding electrode leads of battery cells facing each other, among battery cells of a battery module, the lead welding apparatus comprising: a welding unit configured to weld two electrode leads of the facing battery cells to each other; and a welding jig configured to closely adhere the two electrode leads of the facing battery to each other and press the two electrode leads at one side of the two electrode leads, when welding is performed.

The welding unit may perform welding at a portion where the two electrode leads of the facing battery cells overlap each other, and the welding jig may allow the two electrode leads to overlap each other by pressing one end of one of the two electrode leads which is disposed closer to the welding jig.

The electrode lead of the two electrode leads disposed closer to the welding jig may be formed to be rounded toward the welding jig.

When the welding is performed, the electrode lead disposed closer to the welding jig may be elastically deformed by the welding jig to overlap the other electrode lead of the two electrode leads.

The battery module may include a module case configured to accommodate the plurality of battery cells and allow the electrode leads to be exposed toward the lead welding apparatus, and the overlapping portion may be not in contact with the module case when the welding is performed.

The welding may be laser welding.

In addition, the present disclosure provides a battery module, which is manufactured using the lead welding apparatus according to the above embodiment.

Moreover, the present disclosure provides a battery pack, comprising: at least one battery module according to the above embodiment; and a pack case configured to package the at least one battery module.

Advantageous Effects

According to various embodiments as above, it is possible to provide a lead welding apparatus which may prevent a module case from being damaged when electrode leads of battery cells of the battery module are welded and improve the welding quality, a battery module manufactured by the lead welding apparatus, and a battery pack comprising the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
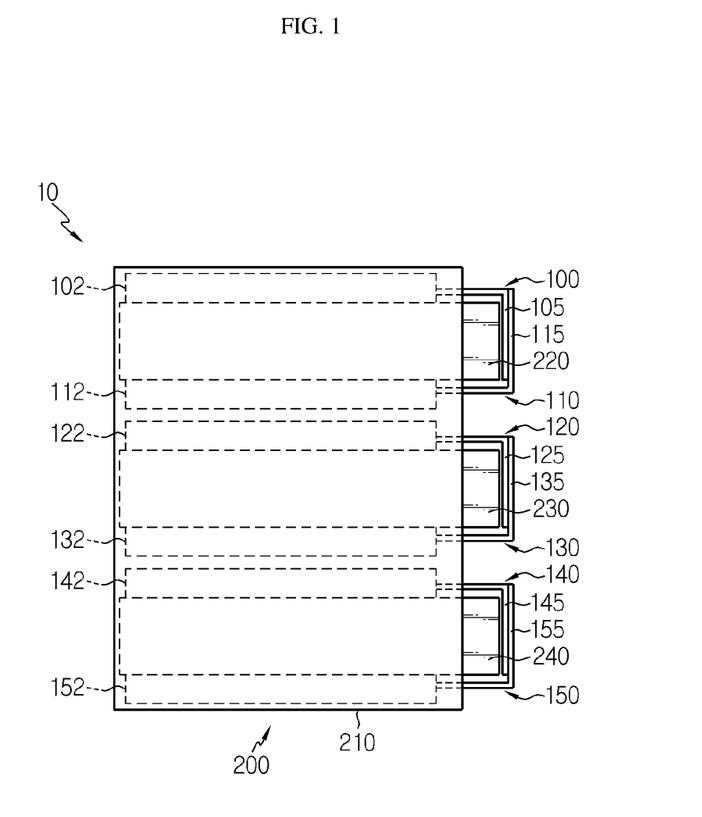
FIG. 1 is a diagram for illustrating a battery module according to an embodiment of the present disclosure.
Figure 2:
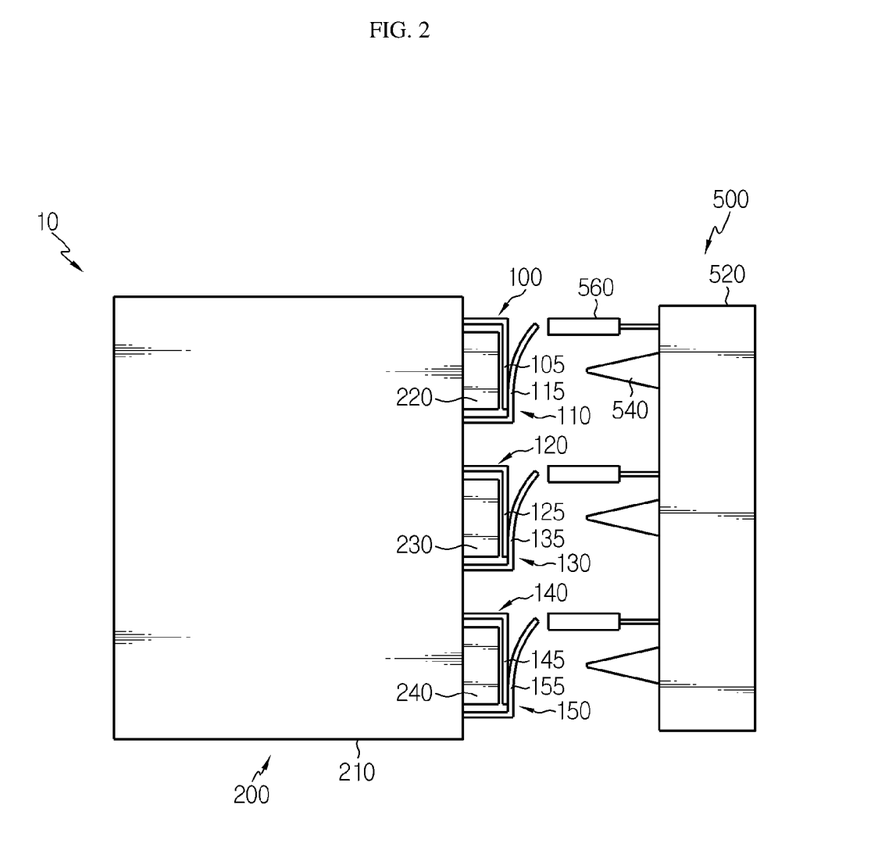
FIGS. 2 to 5 are diagrams for illustrating that electrode leads of the battery module depicted in FIG. 1 are welded using a lead welding apparatus according to an embodiment of the present disclosure.
Figure 3:
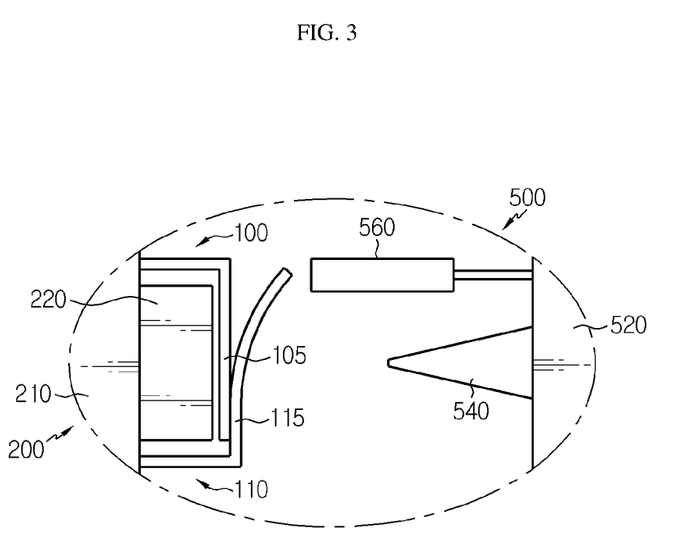
Figure 4:
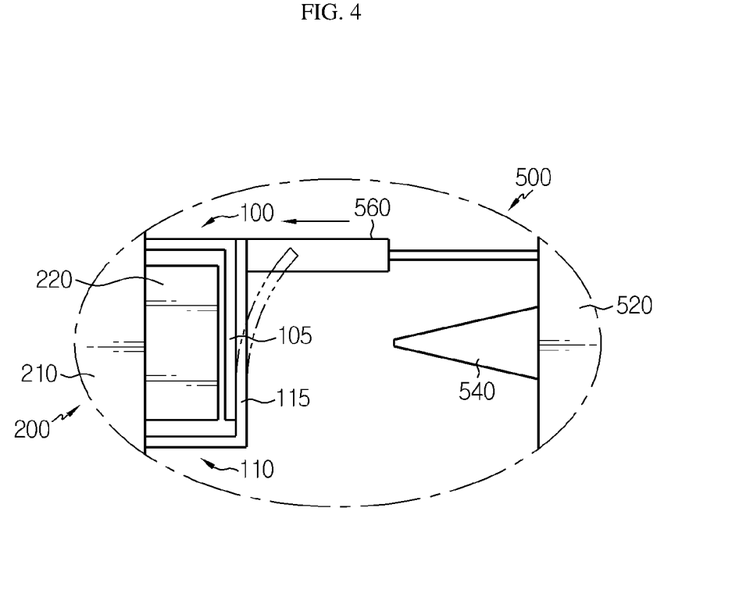
Figure 5:
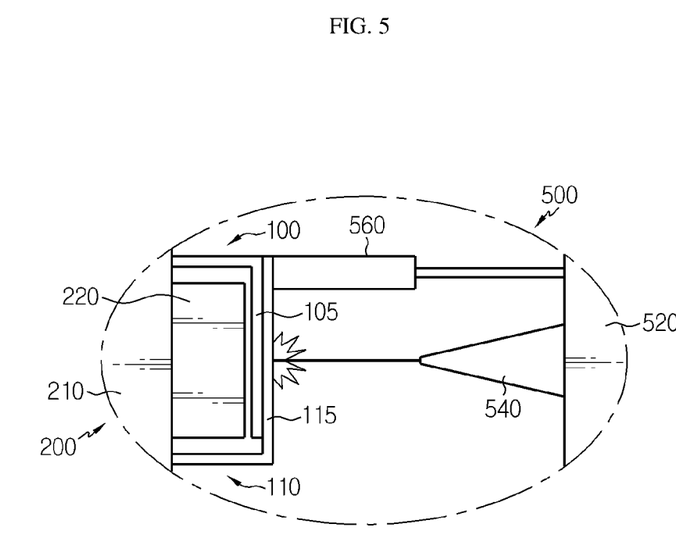

FIG. 1 is a diagram for illustrating a battery module according to an embodiment of the present disclosure.

Referring to FIG. 1, a battery module 10 may include a plurality of battery cells 100, 110, 120, 130, 140, 150 and a module case 200.

The plurality of battery cells 100, 110, 120, 130, 140, 150 may be pouch-type secondary batteries and may be stacked to be electrically connected to each other. The plurality of battery cells 100, 110, 120, 130, 140, 150 may be provided in various numbers depending on a required energy capacity or the like, and this embodiment will be described based on the case where six battery cells, namely first to sixth battery cells 100, 110, 120, 130, 140, 150 are provided.

The first battery cell 100 may include an electrode assembly, a battery case 102 accommodating the electrode assembly, and an electrode lead 105 protruding out of the battery case 102 and electrically connected to the electrode assembly.

The second battery cell 110 may include an electrode assembly, a battery case 112 and an electrode lead 115, similar to the first battery cell 100. The electrode lead 115 of the second battery cell 110 may be electrically connected to the electrode lead 105 of the first battery cell 100 by welding or the like at the outside of a module case 200, explained later.

The third battery cell 120 may include an electrode assembly, a battery case 122 and an electrode lead 125, similar to the first battery cell 100 and the second battery cells 110.

The fourth battery cell 130 may include an electrode assembly, a battery case 132 and an electrode lead 135, similar to the first to third battery cells 100, 110, 120. The electrode lead 135 of the fourth battery cell 130 may be electrically connected to the electrode lead 125 of the third battery cell 120 by means of welding or the like at the outside of the module case 200, explained later.

The fifth battery cell 140 may include an electrode assembly, a battery case 142 and an electrode lead 145, similar to the first to fourth battery cells 100, 110, 120, 130.

The sixth battery cell 150 may include an electrode assembly, a battery case 152 and an electrode lead 155, similar to the first to fifth battery cells 100, 110, 120, 130, 140. The electrode lead 155 of the sixth battery cell 150 may be electrically connected to the electrode lead 145 of the fifth battery cell 140 by welding or the like at the outside of the module case 200.

The module case 200 forms an appearance of the battery module 10 and may accommodate the plurality of battery cells 100, 110, 120, 130, 140, 150, namely the first to sixth battery cells 100, 110, 120, 130, 140, 150. Here, the module case 200 may expose the electrode leads 105, 115, 125, 135, 145, 155 of the first to sixth battery cells 100, 110, 120, 130, 140, 150 out of the module case 200. In detail, the module case 200 may expose the electrode leads 105, 115, 125, 135, 145, 155 toward a lead welding apparatus 500, explained later.

The module case 200 may include a case body 210 and a plurality of cell cartridges 220, 230, 240.

The case body 210 forms an appearance of the module case 200 and may accommodate the first to sixth battery cells 100, 110, 120, 130, 140, 150, the plurality of cell cartridges 220, 230, 240 and various components of the battery module 10.

The plurality of cell cartridges 220, 230, 240 are mounted in the case body 210 and may accommodate and fix at least one battery cell among the first to sixth battery cells 100, 110, 120, 130, 140, 150. Hereinafter, this embodiment will be described based on the case where one cell cartridge accommodates two battery cells.

The plurality of cell cartridges 220, 230, 240 may include a first cell cartridge 220, a second cell cartridge 230 and a third cell cartridge 240.

The first cell cartridge 220 may accommodate the first battery cell 100 and the second battery cell 110. The first cell cartridge 220 may be provided to partially protrude out of the case body 210 in a protruding direction of the electrode leads 105, 115 so as to guide the electrode lead 105 protruding out of the case body 210 of the first battery cell 100 and the electrode lead 115 protruding out of the case body 210 of the second battery cell 110.

The second cell cartridge 230 may accommodate the third battery cell 120 and the fourth battery cell 130. The second cell cartridge 230 may be provided to partially protrude out of the case body 210 in a protruding direction of the electrode leads 125, 135 so as to guide the electrode lead 125 protruding out of the case body 210 of the third battery cell 120 and the electrode lead 135 protruding out of the case body 210 of the fourth battery cell 130.

The third cell cartridge 240 may accommodate the fifth battery cell 140 and the sixth battery cell 150. The third cell cartridge 240 may be provided to partially protrude out of the case body 210 in a protruding direction of the electrode leads 145, 155 so as to guide the electrode lead 145 protruding out of the case body 210 of the fifth battery cell 140 and the electrode lead 155 protruding out of the case body 210 of the sixth battery cell 150.

Hereinafter, a welding process among the electrode leads 105, 115, 125, 135, 145, 155 of the battery cells 100, 110, 120, 130, 140, 150 in the battery module 10 will be described in more detail.

FIGS. 2 to 5 are diagrams for illustrating that electrode leads of the battery module depicted in FIG. 1 are welded using a lead welding apparatus according to an embodiment of the present disclosure.

Referring to FIGS. 2 to 5, the electrode leads 105, 115, 125, 135, 145, 155 of the first to sixth battery cells 100, 110, 120, 130, 140, 150 of the battery module 10 may be welded by means of the lead welding apparatus 500 and electrically connected to each other.

The lead welding apparatus 500 may weld electrode leads 105, 115, 125, 135, 145, 155 of facing battery cells 100, 110, 120, 130, 140, 150, among the first to sixth battery cells 100, 110, 120, 130, 140, 150 of the battery module 10.

Accordingly, the lead welding apparatus 500 may weld the electrode lead 105 of the first battery cell 100 and the electrode lead 115 of the second battery cell 110 to be electrically connected to each other, weld the electrode lead 125 of the third battery cell 120 and the electrode lead 135 of the fourth battery cell 130 to be electrically connected to each other, and weld the electrode lead 145 of the fifth battery cell 140 and the electrode lead 155 of the sixth battery cell 150 to be electrically connected to each other.

For this, the lead welding apparatus 500 may include a device body 520, a welding unit 540 and a welding jig 560.

The device body 520 may include various components of the lead welding apparatus 500 for welding. The welding unit 540 and the welding jig 560, explained later, may be mounted to the device body 520.

The welding unit 540 may weld two electrode leads 105 and 115, 125 and 135, 145 and 155 of facing battery cells 100 and 110, 120 and 130, 140 and 150, among the first to sixth battery cells 100, 110, 120, 130, 140, 150.

In detail, the welding unit 540 may weld the electrode lead 105 of the first battery cell 100 and the electrode lead 115 of the second battery cell 110 to each other, weld the electrode lead 125 of the third battery cell 120 and the electrode lead 135 of the fourth battery cell 130 to each other, and weld the electrode lead 145 of the fifth battery cell 140 and the electrode lead 155 of the sixth battery cell 150 to each other. For this, three welding units 540 may be provided. In other words, the welding unit 540 may be provided as much as a half of the number of the battery cells 100, 110, 120, 130, 140, 150.

The three welding unit 540 may perform only at a portion where the two electrode leads 105 and 115, 125 and 135, 145 and 155 of the facing battery cells 100 and 110, 120 and 130, 140 and 150 overlap each other, respectively.

The welding performed by the three welding unit 540 may be laser welding. This is just an example, and the three welding unit 540 may employ other welding methods capable of connecting the electrode leads 105, 115, 125, 135, 145, 155.

The welding jig 560 is slidably mounted to the device body 520, and when the welding is performed, the welding jig 560 may closely adhere two electrode leads 105 and 115, 125 and 135, 145 and 155 of the facing battery cells 100 and 110, 120 and 130, 140 and 150 to each other and press the two electrode leads 105 and 115, 125 and 135, 145 and 155 at one side of the two electrode leads 105 and 115, 125 and 135, 145 and 155.

In detail, three welding jigs 560 may be provided in order to press the electrode lead 105 of the first battery cell 100 and the electrode lead 115 of the second battery cell 110 to each other, press the electrode lead 125 of the third battery cell 120 and the electrode lead 135 of the fourth battery cell 130 to each other, and press the electrode lead 145 of the fifth battery cell 140 and the electrode lead 155 of the sixth battery cell 150 to each other, respectively. In other words, the welding unit 560 may also be provided as much as a half of the number of the battery cells 100, 110, 120, 130, 140, 150.

The three welding jig 560 may press one end of the electrode lead 115, 135, 155 disposed closer to the welding jig 560, among the two electrode leads 105 and 115, 125 and 135, 145 and 155, to allow the two electrode leads 105 and 115, 125 and 135, 145 and 155 to overlap each other.

Hereinafter, the process of welding the electrode leads 105, 115, 125, 135, 145, 155 of the first to sixth battery cells 100, 110, 120, 130, 140, 150 by means of the lead welding apparatus 500 will be described in more detail. The welding between the electrode lead 125 of the third battery cell 120 and the electrode lead 135 of the fourth battery cell 130 and the welding between the electrode lead 145 of the fifth battery cell 140 and the electrode lead 155 of the sixth battery cell 150 are performed in the same way as the welding between the electrode lead 105 of the first battery cell 100 and the electrode lead 115 of the second battery cell 110. Thus, hereinafter, the welding between the electrode lead 105 of the first battery cell 100 and the electrode lead 115 of the second battery cell 110 will be explained in detail.

First, before the welding is performed by the lead welding apparatus 500, the electrode lead 115 disposed closer to the welding jig 560, among the first and second battery cells 100, 110, may be formed to be rounded toward the welding jig 560. Similarly, the electrode lead 135 of the fourth battery cell 130 and the electrode lead 155 of the sixth battery cell 150 may also be formed to be rounded toward the welding jig 560.

When the welding jig 560 performs pressing later, the rounded structure allows the electrode leads 105 and 115, 125 and 135, 145 and 155 to be more closely adhered at a portion where the electrode leads 105 and 115, 125 and 135, 145 and 155 overlap each other.

When the welding is performed by the lead welding apparatus 500, the welding jig 560 may slide at one side of the electrode lead 115 of the second battery cell 110 to press the electrode lead 115 of the second battery cell 110. Accordingly, the electrode lead 115 of the second battery cell 110 disposed closer to the welding jig 560 may be elastically deformed to overlap the electrode lead 105 of the first battery cell 100.

Here, the electrode lead 115 of the second battery cell 110 overlaps the electrode lead 105 of the first battery cell 100 while being deformed from a rounded state at the center of the overlapping portion. Thus, even though the welding jig 560 does not slide well toward the module case 200, the electrode lead 115 of the second battery cell 110 may be more closely adhered to the electrode lead 105 of the first battery cell 100 at the center of the overlapping portion. This may be the same for the electrode leads 125 and 135, 145 and 155 of the third to sixth battery cells 120 and 130, 140 and 150.

In addition, in this embodiment, the electrode lead 105 of the first battery cell 100 and the electrode lead 115 of the second battery cell 110 overlap each other by the pressing work of a single welding jig 560. Thus, the transfer of force caused by the pressing power to the first cell cartridge 220 or the case body 210, which is protruded to guide the electrode lead 105 of the first battery cell 100 and the electrode lead 115 of the second battery cell 110, may be minimized. This may be the same for the electrode leads 125 and 135, 145 and 155 of the third to sixth battery cell 120 and 130, 140 and 150.

Accordingly, in this embodiment, when the welding jig 560 performs pressing, the transfer of force caused by the pressing power to the case body 210 and the cell cartridges 220, 230, 240 of the module case 200 is minimized, and thus it is possible to prevent the case body 210 and the cell cartridges 220, 230, 240 from being bent or damaged due to the pressing.

After that, the lead welding apparatus 500 injects laser or the like to the overlapping portion of the electrode lead 105 of the first battery cell 100 and the electrode lead 115 of the second battery cell 110, by means of the welding unit 540, to weld the electrode leads 105, 115 to each other. At this time, the overlapping portion may be kept not in contact with the first cell cartridge 220 of the module case 200 since the transfer of force caused by the pressing power of the welding jig 560 is minimized as described above. Accordingly, when the welding is performed, the first cell cartridge 220 may also be not influenced by any impact generated by the welding. This may be the same for the second cell cartridge 230 and the third cell cartridge 240.

As described above, when the battery module 10 is welded using the lead welding apparatus 500, the battery module 10 of this embodiment may prevent the case body 210 and the cell cartridges 220, 230, 240 of the module case 200 from being bent or damaged.

In addition, in this embodiment, since it is possible to prevent the module case 200 from being damaged when the welding unit 540 of the lead welding apparatus 500 is operated, it is also possible to prevent a focal length of the welding unit 540 from being deviated due to the damage of the module case 200 when the welding unit 540 injects laser or the like.

Therefore, in this embodiment, the welding quality of the welding unit 540 may be further improved, and thus it is possible to more securely prevent heating of the battery module or short circuit between the electrode leads due to contact resistance, which may be caused later by bad welding.

As described above, when the electrode leads 105 and 115, 125 and 135, 145 and 155 of the battery cells 100 and 110, 120 and 130, 140 and 150 are welded, the battery module 10 of this embodiment may prevent the module case 200 from being damaged and also greatly improve the welding quality.

Figure 6:
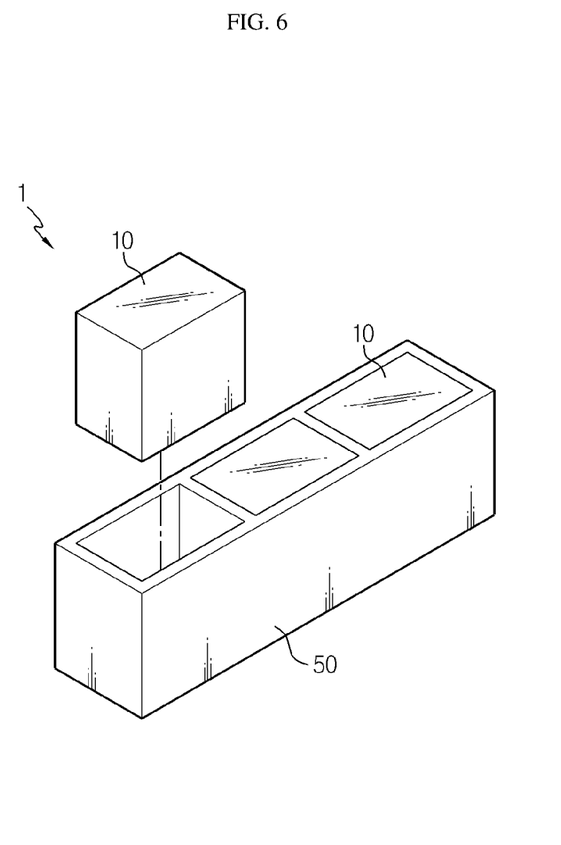
FIG. 6 is a diagram for illustrating a battery pack according to an embodiment of the present disclosure.

FIG. 6 is a diagram for illustrating a battery pack according to an embodiment of the present disclosure.

Referring to FIG. 6, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery pack 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A lead welding apparatus, which is used for welding electrode leads of battery cells facing each other, among battery cells of a battery module, the lead welding apparatus comprising:
    a welding unit configured to weld two electrode leads of the facing battery cells to each other; and
    a single welding jig configured to closely adhere the two electrode leads of the facing battery to each other and press the two electrode leads at only one side of only one of the two electrode leads from only one direction, when welding is performed, such that the lead welding apparatus directly contacts only the one side of only one of the two electrode leads during welding,
    wherein the welding jig is further configured to allow the two electrode leads to overlap each other by pressing one end of one of the two electrode leads disposed closer to the welding jig.

2. The lead welding apparatus according to claim 1, wherein:
    the welding unit is further configured to perform welding at a portion where the two electrode leads of the facing battery cells overlap each other.

3. The lead welding apparatus according to claim 2, wherein the welding jig is further configured to receive an electrode lead of the two electrode leads, closer to the welding jig, that is rounded toward the welding jig.

4. The lead welding apparatus according to claim 3, wherein, when the welding is performed, the welding jig is further configured to elastically deform the electrode lead closer to the welding jig to overlap the other electrode lead of the two electrode leads.

5. The lead welding apparatus according to claim 2, wherein:
    the battery module includes a module case configured to:
        accommodate the plurality of battery cells; and
        allow the electrode leads to be exposed toward the lead welding apparatus; and
    the overlapping portion is not in contact with the module case when the welding is performed.

6. The lead welding apparatus according to claim 1, wherein the welding is laser welding.

7. The lead welding apparatus according to claim 1, wherein the welding jig is disposed at only one side of the welding unit.

8. The lead welding apparatus according to claim 1, wherein the welding jig is configured to directly contact only one of the two electrode leads during welding.

* * * * *